(12) United States Patent
Black et al.

(10) Patent No.: US 8,214,465 B2
(45) Date of Patent: Jul. 3, 2012

(54) METHOD AND SYSTEM OF TRANSPORTING MEDIA SIGNALS AND ALLOCATING ASSETS

(75) Inventors: Neville A. Black, Collegeville, PA (US); Robert Gaydos, Harleysville, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1362 days.

(21) Appl. No.: 11/115,926

(22) Filed: Apr. 27, 2005

(65) Prior Publication Data
US 2006/0248464 A1 Nov. 2, 2006

(51) Int. Cl.
*G06F 15/177* (2006.01)
(52) U.S. Cl. ........... 709/220; 725/107; 725/9; 725/131; 709/223; 709/226
(58) Field of Classification Search .......... 709/223–229, 709/249, 239, 244; 370/352, 398, 395.3–395.32, 370/400, 419–422, 432; 725/63–73, 78–85, 725/100–123, 131–134, 151–153
See application file for complete search history.

(56) References Cited

U.S. PATENT DOCUMENTS

| | | | | |
|---|---|---|---|---|
| 5,790,806 | A * | 8/1998 | Koperda | 709/252 |
| 6,065,049 | A * | 5/2000 | Beser et al. | 709/218 |
| 6,240,553 | B1 * | 5/2001 | Son et al. | 725/95 |
| 6,493,876 | B1 * | 12/2002 | DeFreese et al. | 725/100 |
| 6,598,233 | B1 * | 7/2003 | Choi | 725/151 |
| 6,636,505 | B1 * | 10/2003 | Wang et al. | 370/352 |
| 6,665,715 | B1 | 12/2003 | Houri | |
| 6,704,288 | B1 * | 3/2004 | Dziekan et al. | 370/248 |
| 7,065,577 | B1 * | 6/2006 | Keller-Tuberg | 709/227 |
| 7,139,247 | B2 * | 11/2006 | Desai et al. | 370/255 |
| 7,203,201 | B2 * | 4/2007 | Son et al. | 370/401 |
| 7,246,366 | B1 * | 7/2007 | Addington et al. | 725/93 |
| 7,380,263 | B2 * | 5/2008 | Shintani | 725/59 |
| 7,383,243 | B2 * | 6/2008 | Conkwright et al. | 1/1 |
| 7,620,033 | B2 * | 11/2009 | Chu et al. | 370/352 |
| 7,987,228 | B2 * | 7/2011 | Mckeown et al. | 709/202 |
| 8,015,271 | B2 * | 9/2011 | Mckeown et al. | 709/223 |
| 8,087,058 | B2 * | 12/2011 | Cohen | 725/116 |
| 2002/0038455 | A1 * | 3/2002 | Srinivasan et al. | 725/35 |
| 2002/0069420 | A1 * | 6/2002 | Russell et al. | 725/92 |
| 2003/0065520 | A1 * | 4/2003 | Jutzi et al. | 705/1 |
| 2004/0187159 | A1 * | 9/2004 | Gaydos et al. | 725/92 |
| 2004/0230994 | A1 * | 11/2004 | Urdang et al. | 725/88 |
| 2005/0043060 | A1 | 2/2005 | Brandenberg et al. | |
| 2005/0212504 | A1 * | 9/2005 | Revital et al. | 324/100 |
| 2005/0249130 | A1 * | 11/2005 | Schutte et al. | 370/254 |
| 2005/0251845 | A1 * | 11/2005 | McDowell | 725/126 |
| 2008/0130627 | A1 * | 6/2008 | Chen et al. | 370/351 |
| 2009/0150957 | A1 * | 6/2009 | Jerding et al. | 725/114 |

FOREIGN PATENT DOCUMENTS
WO   WO 02/09353 A2   1/2002
* cited by examiner

*Primary Examiner* — Greg C Bengzon
(74) *Attorney, Agent, or Firm* — Banner & Witcoff, Ltd.

(57) ABSTRACT

Methods and systems of transporting media signals to user devices as a function of users associated therewith and to allocating assets in such systems as a function of users receiving the media signals so as to permit signals, assets, and other features to be directed, allocated, and otherwise distributed as a function of the users associated therewith.

28 Claims, 1 Drawing Sheet

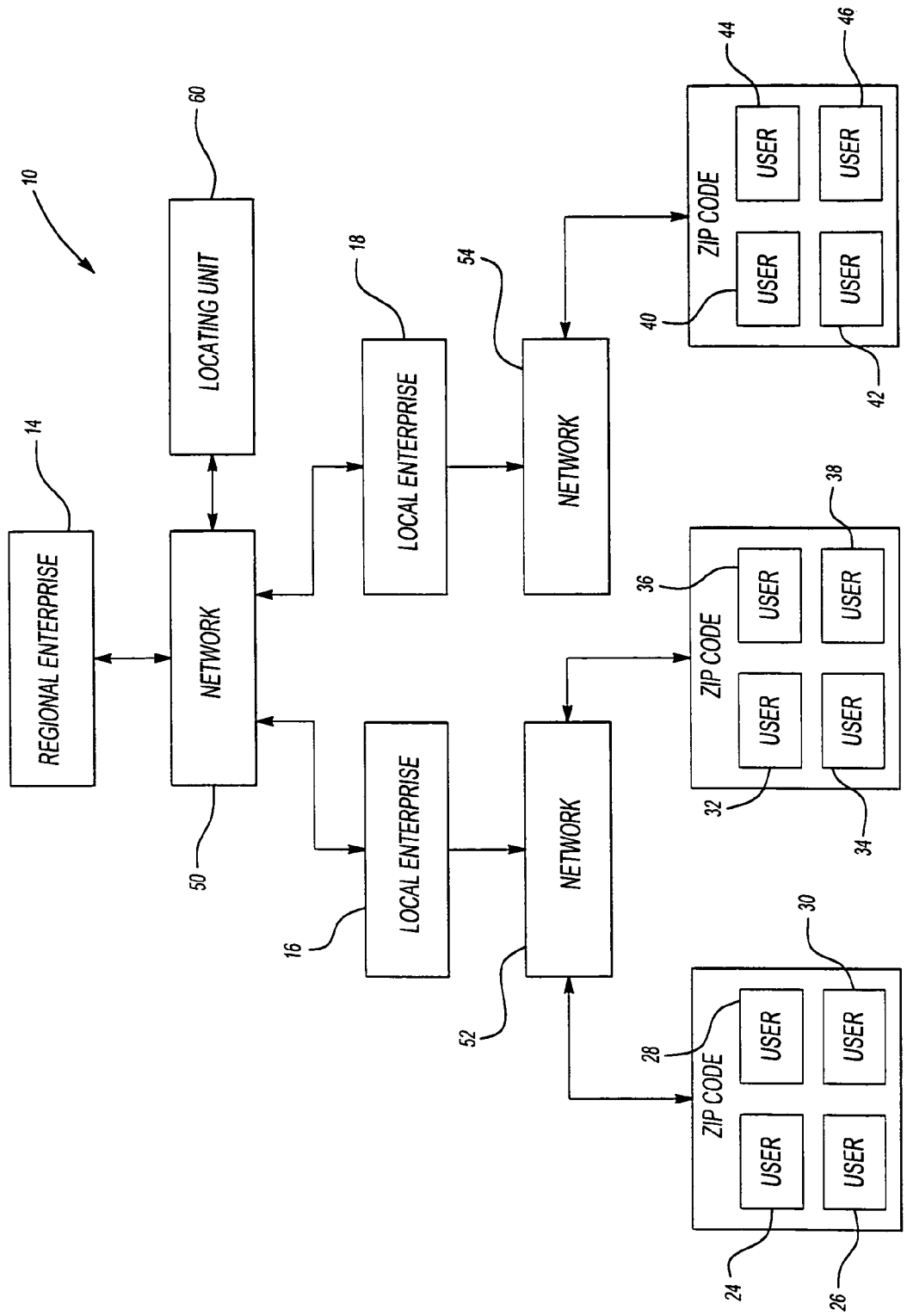

METHOD AND SYSTEM OF TRANSPORTING MEDIA SIGNALS AND ALLOCATING ASSETS

BACKGROUND OF THE INVENTION

1. Field of the Invention

The present invention relates to methods and systems of transporting media signals to user devices as a function of users associated therewith and to allocating assets in such systems as a function of users receiving the media signals.

2. Background Art

In cable systems, signals are distributed in a broadcast fashion in that the signals are distributed to user devices as a function of identities associated with the user devices. Such broadcasts are without regard to the identity of the user associated with the devices. Because the signals are distributed as a function of the user devices and not the users, the cable systems are unable to control signal delivery, asset allocation, and other features as a function of the users associated with the user devices.

SUMMARY OF THE INVENTION

One aspect of the present invention relates to associating users with user devices so as to permit signals, assets, and other features to be directed, allocated, and otherwise distributed as a function of the users associated therewith.

One aspect of the present invention relates to a method for use in a system wherein users receive services from a provider through one or more user devices. The method relates to locating the user devices as a function of the user(s) associated therewith. The method may include associating the user devices with signal paths, associating the user devices with user information of the users, and locating the user devices as a function of the signal paths and user information.

One aspect of the present invention relates to a method of transporting media signals to user devices in a system. The method may include associating the user devices with one or more users thereof, associating geographic identifiers with the user devices based on the users thereof, and allocating assets associated with transporting the media signals as a function of the geographic identifiers associated with the user devices.

One non-limiting aspect of the present invention relates to a system of transporting media signals to user devices. The system may include one or more local enterprises configured for transporting media signals over one or more signal paths to user devices associated with each local enterprise, and at least one locating unit in communication with the local enterprise(s) and configured to associate users with the user devices so as to permit the delivery of media signals to the user devices as a function of the users associated with the user devices.

In accordance with one non-limiting aspect of the present invention, the system may further include a regional enterprise in communication with the locating unit and one or more of the local enterprises. The regional enterprise may be configured to receive instructions and other commands from the locating unit to facilitate transporting media signals therefrom to the local enterprises as a function of the users associated with the local enterprise, whereby the local enterprises may then transport the media signals delivered thereto to the user devices.

In accordance with one non-limiting aspect of the present invention, the user devices may be configured to output signals for communication to the locating unit to facilitate associating the users with the user devices. In particular, the user devices may be configured to output signal path indicators of the signal paths on which the user devices receive signals from the local enterprises along with user identifying signals which uniquely identify the user devices.

In accordance with one non-limiting aspect of the present invention, the locating unit correlates user information and enterprise information with the information communicated from the user devices so as to facilitate associating the users with the user devices. In more detail, the locating unit may receive the information from the user devices for cross-referencing with user information (user names, address, geographic area, etc.) and information provided by the local enterprises (user device IDs, signal path IDs, etc). This information may be tabulated or otherwise compiled by the locating unit for use in performing any number of operations, asset allocation to the local and regional enterprises based on the geographical areas of the user devices which they support, message routing of messages addressed to specific users, such as from remote systems, from server to server or from enterprise to enterprise as a function of the specified user, and other operations dependent on tying signal path information with user information.

The above features and advantages, along with other features and advantages of the present invention, are readily apparent from the following detailed description of the invention when taken in connection with the accompanying drawings.

BRIEF DESCRIPTION OF THE DRAWINGS

FIG. 1 illustrates a system in accordance with one non-limiting aspect of the present invention.

DETAILED DESCRIPTION OF THE PREFERRED EMBODIMENT(S)

FIG. 1 illustrates a system 10 in accordance with one non-limiting aspect of the present invention. The system 10 may be configured for transmitting signals from one or more regional enterprises 14 and/or local enterprises 16-18 to a number of user devices 24-46. The signals may relate to any number of services provided by a system operator and may be transmitted over networks 50-54.

The local enterprises 16-18 may include any number of features and configurations for transporting and/or receiving signals from the user devices 24-46. In accordance with one non-limiting aspect of the present invention, the local enterprises 16-18 may be configured as headend units, such as those associated with cable systems, for delivering media content signals, high speed internet data signals, and the like to the user devices 24-46.

The regional enterprise 14 may include any number of features and configurations for transporting and/or receiving signals from the local enterprises 16-18. In particular, the regional enterprise 14 may include servers and other features for storing data which may be delivered or otherwise accessible to the local enterprises 16-18. The present invention contemplates the regional enterprise being a local repository of data associated with two or more local enterprises so that only one set of data need be stored, rather than storing the same data one two or more local enterprises 16-18. More than one regional enterprise 14 may be include to regionally support any number of local enterprises 16-18.

The networks 50-54 may include any number of features and configurations for supporting the transportation of signals between the enterprises 14-18 and/or the enterprises 14-18 and the user devices 24-46. In particular, the present invention contemplates the networks 50-54 being configured to transport signals over twisted pair cable, hybrid-fiber cable, terrestrial or extraterrestrial wireless, public telephone switching networks (PSTNs), and the like.

The networks 50-54 may be configured to communicate signals with devices and locations outside of the system 10, such as to permit the regional or local enterprises 14-18 to receive and/or transmit messaging and other signals to and from remote sources, such as the Internet. In this manner, and as described below in more detail, the present invention may support transporting messaging signals communicated from outside the system to specific users within the system, such as to permit transmitting email and video mail, voice over internet protocol (VoIP), teleconferencing, and other messaging (user specific) signals to the users associated with the user devices 24-46.

The user devices 24-46 may be any number of user devices associated with the system operator, including settop boxes (user devices), computers, digital video recorders (DVRs), personal digital recorders (PVRs), media terminal adapters (MTAs), VoIP devices, outlet digital adapters (ODAs), personal digital assistants (PDAs), cable modems, and the like. The present invention contemplates any number of user devices and is not intended to be limited to the foregoing.

In accordance with one non-limiting aspect of the present invention, the system 10 may include a locating unit 60 configured to assist in locating and assigning users to one or more of the user devices 24-46. In particular, the present invention contemplates configuring the locating unit 60 to assist the regional or local enterprises 14-18 in transporting user specific signals to the user devices 24-46 as a function of the users associated therewith. In this manner, the present invention contemplates delivering signals to desired users as opposed to broadcasting signals to all user devices 24-46, however, the present invention maintains the ability to broadcast signals to all users if needed, such as when providing signals relating to broadcast services.

In accordance with one non-limiting aspect of the present invention, the locating unit 60 may be configured to locate users associated with the user devices 24-46 as a function a signal path and user information associated therewith. For example, the locating server 60 may associate users with user devices 24-46 by determining user information from a billing server (not shown), or other feature associated with the system operator that may be in communication therewith, and then cross-referencing this information with signal path identifiers associated with the user devices 24-46.

In more detail, the user information obtained from the billing server may indicate one or more users associated with the account, the names or user names of the users, their address or other geographic data, and other information commonly included when subscribing to the system services. The user information may be cross-referenced with the signal path information so as to coordinate signal transmission with secondary information (user information), thereby allowing the locating unit to associate the user devices 24-46 with users, geographical areas, and other user information.

The signal path identifiers may be determined as a function how the local enterprises 16-18 communicate with the user devices. For example, the system 10 may transport narrowcast signals to the user devices over one or more separately identifiable QAM channels. In accordance with one non-limiting aspect of the present invention, the local enterprises 16-18 may communicate instructional signals to the user devices 24-46 that indicate which QAM channels the devices 24-46 are to listen to for receiving channel maps, video on demand, and other narrowcast applications. In response thereto, the user devices 24-46 may be configured to listen to the indicated QAM channels and to determine the signal path identifiers associated therewith.

In accordance with one non-limiting aspect of the present invention, the signal path identifiers may be communicated form the user devices 24-46 to the locating unit 60, either directly or by way of one of the local or regional enterprises 14-18. The information from the user devices 24-46 preferably includes a user device identifier for the communicating user device which may be used for referencing with other information collected by the locating unit 60. In more detail, the user device identifier may be a STB number, IP address, or other feature assigned thereto, such as one which may be assigned thereto by one of the local or regional enterprises 14-18.

Likewise, the local or regional enterprises 14-16 may communicate enterprise information to the locating unit 60, such as information relating to signal path identifiers associated therewith, and if known, user device IDs also associated therewith. In this manner, the locating unit 60 may cross-reference the information communicated from the user devices 2446 with the information communicated from the local and regional enterprises 14-18 to provide a benchmark for comparison with the user information collect from the billing server or other subscriber subscription database.

Finally, from the user information (subscriber/billing information), which preferably includes the user device identifiers associated with the users, the locating unit 60 is able to build an entry based on the user which indicates the regional and local enterprise associated therewith, the signal paths for delivering narrowcast applications thereto, and other user information, such as geographic information. This information may also be extrapolated to facilitate command and control of the local and regional enterprises 14-18, such as by associating the enterprises 14-18 according to the geographical areas they support, and/or to perform other operations associated with tying user information with signal path information and support.

In accordance with one non-limiting aspect of the present invention, geographical areas associated with the user devices 24-46 may be determined as a function of the signal path identifiers and billing/account information. In particular, the locating unit 60 may cross-reference the QAM channel identifiers associated with each of the local enterprises 16-18 with the QAM channel identifiers (signal path identifiers) communicated from the user devices 24-46. The cross-referencing, as shown in FIG. 1, may be used to associate the local enterprises 16-18 with the user devices based on zip codes, i.e., the first local enterprise 16 supports user devices 24-38 in a first and second zip code and the second local enterprise 18 supports user devices in a third zip code.

In accordance with one non-limiting aspect of the present invention, the geographic association of the user devices 24-46 may be used to perform any number of operations, including geographic based advertising. The geographic advertising may include storing advertisements on streaming video servers on the regional or local enterprises 14-18 a function of the geographic areas associated therewith. For example, an advertisement target to users in the first zip code (or other geographic identifiers, such as midwest, east coast, etc.) may be stored on the first local enterprise 16 as opposed to the second local enterprise 18. Likewise, an advertisement associated with the second and third zip codes may be stored on the regional enterprise 14 instead of both of the first and second enterprises 16-18, such as to reduce storage redundancy and costs. Moreover, this information may be used to support any number of geographic specific signal transmission operations, such as for geographic dependent television broadcasting.

In accordance with one non-limiting aspect of the present invention, the system 10 may be configured to allocate assets according to the geographic location of the user devices 24-46. For example, advertisements, messages, or the user specific media may be allocated to one or more of the regional or local enterprises 14-18 as a function of the user devices associated therewith.

In accordance with one non-limiting aspect of the present invention, the locating unit 60 may facilitate allocating assets and data associated with media signals at locations which provide the lowest transmission time to the user, such as by storing data relating to email messages on the local enterprise associated with the user and/or storing video data associated with video mail messages at the local enterprise associated with the user. For example, if the user is located in the first zip code, then the data associated with such messaging signals may be allocated to the first local enterprise 16, as opposed to the regional enterprise 14 or the second local enterprise 18.

In accordance with one non-limiting aspect of the present invention, the allocation of resources may be dependent on transmission costs. For example, the cost of transmitting data from the regional enterprise 14 to one of the local enterprises 16-18 associated with the user may be more costly than storing the data on the associated local enterprise, i.e., long-haul transmission from the regional enterprise 14 may be more costly than non-long haul transmissions from the local enterprise(s) 16-18.

In accordance with one non-limiting aspect of the present invention, the allocation of resource may be dependent on storage costs. For example, the cost of storing data on the regional enterprise 14 if the data is to be delivered to user devices associated with both the first and second local enterprises 16-18 may be more cost effective than duplicate storage on both the first and second local enterprises 16-18.

In accordance with one non-limiting aspect of the present invention, the system 10 may receive remote communications destined for particular users of the system 10 such that the communications may be directed to the desired user as a function of locating instructions provided by the location unit 60. For example, the regional and local enterprises 14-18 or other system backend may be configured to communicate with the Internet or other remote communication source(s) to receive and/or transmit user specific signals. The locating unit 60 may operate with such systems to facilitate directing the user specific signals to the associated user device 24-46 and/or the storage of data related thereto to servers and other features associated with the user that may provide the most effective transmission time or operation and/or transmission or storage costs.

The system 10 shown in FIG. 1 may relate to cable systems or other telecommunication systems, such as satellite based systems. As such, the present invention is not intended to be limited to one system. Rather, the present invention contemplates its application in other environments, such as satellite television, terrestrial and extraterrestrial messaging systems, and the like wherein services are broadcasted (i.e. user generic) but include features which support cross-referencing user information (i.e., account/billing information) with signal path identifiers, such as spot beams used in satellite systems.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
receiving, from each of one or more servers, server signal information identifying a set of channels;
receiving, from a user device, signal path information including an identification of a set of user channels that has been listened to by the user device and on which the user device has successfully received signals; and
in response to receiving the signal path information:
comparing the server signal information received from each of the one or more servers to the signal path information,
based on the comparison, determining that the server signal information received from a first server of the one or more servers identifies a set of channels that matches the set of user channels that has been listened to by the user device and on which the user device has successfully received signals,
identifying a geographic area of the user device as a function of the signal path information and user information,
cross-referencing the signal path information and other signal path information received from one or more other user devices, and
associating the user device to the first server, wherein the first server is included in a regional enterprise or a local enterprise.

2. The method of claim 1, wherein the set of user channels that has been listened to by the user device and on which the user device has successfully received signals are a set of narrowcast transmission channels.

3. The method of claim 1 wherein identifying the geographical area of the user device includes identifying at least one of a zip code and a designated market area (DMA).

4. The method of claim 1 further comprising:
transporting geographic specific signals to the user device as a function of the geographical area associated therewith.

5. The method of claim 1 further comprising:
determining the user information from billing information associated with the user device.

6. The method of claim 1 further comprising:
associating one or more users with the user device as a function of user information, resulting in associations between the one or more users and the user device; and
transporting signals targeted to the one or more users as a function of the associations between the one or more users and the user device.

7. A method comprising:
receiving, from one or more servers, server signal information identifying a set of channels;
receiving, from a user device, signal path information including an identification of a set of user channels that has been listened to by the user device and on which the user device has successfully received signals;
identifying a geographic area of the user device as a function of the signal path information and user information;
cross-referencing the signal path information and other signal path information received from one or more other user devices;
associating the geographic area with the user device;
comparing the server signal information received from each of the one or more servers to the signal path information;

based on the comparison, determining that the server signal information received from a first server of the one or more servers identifies a set of channels that matches the set of user channels that has been listened to by the user device and on which the user device has successfully received signals;

associating the first server to the user device and the geographic area associated with the user device, wherein the first server is included in a regional enterprise or a local enterprise; and allocating, to the first server, assets associated with transporting media signals to at least one of the user device and the geographic area.

8. The method of claim 7 wherein the media signals contain video content targeted to one or more users, and wherein allocating the assets includes allocating assets related to the video content to the first server as a function of the geographic area.

9. The method of claim 7 wherein allocating the assets includes allocating storage of data related to the media signals to the first server.

10. The method of claim 8 wherein allocating the assets includes allocating, to the first server, one or more assets as a function of network transmission costs associated with transporting the video content from the first server to the user device.

11. The method of claim 8 wherein allocating the assets includes allocating one or more assets as a function of network transmission time associated with transporting the video content from the first server to the user device.

12. The method of claim 8 wherein allocating the assets includes allocating one or more assets as a function of network storage costs associated with transporting the video content from the first server to the user device.

13. The method of claim 7 wherein the media signals contain advertisements targeted to one or more users.

14. A method, comprising:
receiving, from one or more content delivery servers, server signal information identifying a set of channels;
receiving, from a user device, signal path information including an identification of a set of user channels that has been listened to by the user device and on which the user device has successfully received narrowcast data;
identifying a geographic area of the user device as a function of the signal path information and user information;
cross-referencing the signal path information and other signal path information received from one or more other user devices;
comparing the server signal information received from each of the one or more content delivery servers to the signal path information;
based on the comparison, determining that the server signal information received from a first content delivery server of the one or more content delivery servers identifies a set of channels that matches the set of user channels on which the user device has successfully received narrowcast data;
associating the user device to the first content delivery server, wherein the first content delivery server is included in a regional enterprise or a local enterprise; and
using the first content delivery server to transmit electronic content towards the user device.

15. The method of claim 14, wherein the electronic content is video advertising content, and wherein using the first content delivery server to transmit the electronic content towards the user device includes transmitting the video advertising content over a cable television data network.

16. The method of claim 15, wherein the cable television data network is a hybrid-fiber cable network.

17. The method of claim 14, wherein the set of user channels that has been listened to by the user device and on which the user device has successfully received signals is one or more quadrature-amplitude modulation (QAM) channels.

18. The method of claim 14, further comprising:
electronically storing a database containing user geographic information and information identifying narrowcast signal paths reported by respective users as having been successfully received; and
wherein cross-referencing the signal path information and other signal path information received from one or more other user devices includes cross-referencing the signal path information and the information identifying narrowcast signal paths reported by respective users as having been successfully received.

19. A locating unit processing device, configured to:
receive, from one or more video servers, server signal information identifying a set of channels;
receive, from a user device, signal path information including an identification of a set of user channels that has been listened to by the user device and on which the user device has successfully received signals; and
in response to receiving the signal path information:
identify a geographic area of the user device as a function of the signal path information and user information,
cross-reference the signal path information and other signal path information received from one or more other user devices,
compare the server signal information received from each of the one or more video servers to the signal path information,
based on the comparison, determine that the server signal information received from a first video server of the one or more video servers identifies a set of channels that matches the set of user channels that has been listened to by the user device and on which the user device has successfully received signals, and
associate the user device to the first video server, wherein the first video server is included in a regional enterprise or a local enterprise.

20. The locating unit processing device of claim 19, wherein each channel in the set of user channels that has been listened to by the user device and on which the user device has successfully received signals is a channel received by the user device for narrowcast transmissions.

21. The locating unit processing device of claim 20, wherein each channel in the set of user channels that has been listened to by the user device and on which the user device has successfully received signals is a QAM channel listened to by the user device.

22. The locating unit processing device of claim 19, wherein the geographic area is at least one of a zip code and a designated market area (DMA).

23. The locating unit processing device of claim 22, further configured to:
transport geographic specific signals to the user device as a function of the geographical area.

24. The method of claim 1, wherein at least one user channel in the set of user channels that has been listened to by the user device and on which the user device has successfully received signals is a QAM channel that the user device has been instructed to listen to in order to receive television channel maps.

25. The method of claim 1, wherein at least one user channel in the set of user channels that has been listened to by the user device and on which the user device has successfully received signals is a signal path that is listened to by the user device to receive at least one of media content signals and high speed internet data signals.

26. The method of claim 1, further comprising:
associating the first server to the geographic area.

27. The method of claim 1, wherein the signal path information is QAM channel information and the set of user channels that has been listened to by the user device and on which the user device has successfully received signals is a set of QAM channels that has been listened to by the user device and on which the user device has successfully received signals.

28. The method of claim 1, wherein the signal path information is a listing of the set of user channels.

* * * * *

UNITED STATES PATENT AND TRADEMARK OFFICE
CERTIFICATE OF CORRECTION

| | | |
|---|---|---|
| PATENT NO. | : 8,214,465 B2 | Page 1 of 1 |
| APPLICATION NO. | : 11/115926 | |
| DATED | : July 3, 2012 | |
| INVENTOR(S) | : Neville A. Black et al. | |

It is certified that error appears in the above-identified patent and that said Letters Patent is hereby corrected as shown below:

In Column 4, Line 23:
    Please replace "2446" with --24-46--

Signed and Sealed this
Eleventh Day of September, 2012

David J. Kappos
*Director of the United States Patent and Trademark Office*